(12) United States Patent
Carlavan et al.

(10) Patent No.: US 11,345,083 B2
(45) Date of Patent: May 31, 2022

(54) ADDITIVE MANUFACTURING MACHINE COMPRISING A DEVICE FOR THE DISTRIBUTION OF POWDER ONTO A MOBILE SURFACE USING VIBRATION

(71) Applicant: AddUp, Cebazat (FR)

(72) Inventors: Cedric Carlavan, Cebazat (FR); Gilles Walrand, Cebazat (FR)

(73) Assignee: ADDUP, Cebazat (FR)

( * ) Notice: Subject to any disclaimer, the term of this patent is extended or adjusted under 35 U.S.C. 154(b) by 0 days.

(21) Appl. No.: 16/977,134

(22) PCT Filed: Feb. 25, 2019

(86) PCT No.: PCT/FR2019/050427
§ 371 (c)(1),
(2) Date: Sep. 1, 2020

(87) PCT Pub. No.: WO2019/166727
PCT Pub. Date: Sep. 6, 2019

(65) Prior Publication Data
US 2021/0001544 A1   Jan. 7, 2021

(30) Foreign Application Priority Data

Mar. 1, 2018 (FR) ..................... 1851809

(51) Int. Cl.
*B29C 64/153* (2017.01)
*B29C 64/245* (2017.01)
(Continued)

(52) U.S. Cl.
CPC .......... *B29C 64/153* (2017.08); *B29C 64/205* (2017.08); *B29C 64/227* (2017.08);
(Continued)

(58) Field of Classification Search
CPC ... B29C 64/255; B29C 64/343; B29C 64/307; B29C 64/329; B29C 64/25
See application file for complete search history.

(56) References Cited

U.S. PATENT DOCUMENTS 3,091,368 A   5/1963 Harley et al.
4,270,675 A * 6/1981 Wicks ................. B65G 65/44
                                                                    222/196

(Continued)

FOREIGN PATENT DOCUMENTS

CN     107457992 A   12/2017
GB        608075        9/1948
WO   2017/108868 A1   6/2017

OTHER PUBLICATIONS

International Search Report dated May 21, 2019, in corresponding PCT/FR2019/050427 (6 pages).

(Continued)

*Primary Examiner* — Timothy Kennedy
(74) *Attorney, Agent, or Firm* — Venable LLP

(57) ABSTRACT

An additive manufacturing machine (10) comprises at least one movable powder reception surface (28) capable of being displaced in proximity to a manufacturing zone (20), a powder spreading device (30), and a device (32) for distributing powder on the movable reception surface. The powder distribution device comprises a buffer tank (38) linked to a powder supply (40) and a distribution duct (42) linking the buffer tank to a powder distribution point (P1) situated above the movable reception surface, and the distribution duct (42) is mounted on a vibrating device making it possible to vibrate the distribution duct so as to generate a continuous flow of powder in the distribution duct and from the buffer tank to the powder distribution point.

12 Claims, 2 Drawing Sheets

(51) Int. Cl.
  *B29C 64/255* (2017.01)
  *B29C 64/343* (2017.01)
  *B29C 64/227* (2017.01)
  *B29C 64/268* (2017.01)
  *B29C 64/205* (2017.01)
  *B29C 64/25* (2017.01)
  *B33Y 30/00* (2015.01)

(52) U.S. Cl.
  CPC ............ *B29C 64/245* (2017.08); *B29C 64/25* (2017.08); *B29C 64/255* (2017.08); *B29C 64/268* (2017.08); *B29C 64/343* (2017.08); *B33Y 30/00* (2014.12)

(56) References Cited

U.S. PATENT DOCUMENTS

| | | | | |
|---|---|---|---|---|
| 5,038,014 | A * | 8/1991 | Pratt | B29C 64/124 219/121.64 |
| 10,807,308 | B2 | 10/2020 | Pialot et al. | |
| 10,967,568 | B2 | 4/2021 | Walrand | |
| 2009/0294469 | A1 | 12/2009 | Poulain et al. | |
| 2017/0144248 | A1* | 5/2017 | Yoshimura | B29C 64/153 |
| 2017/0348771 | A1* | 12/2017 | Kawada | B29C 64/35 |
| 2019/0001560 | A1 | 1/2019 | Walrand | |
| 2022/0001453 | A1 | 1/2022 | Effernelli et al. | |

OTHER PUBLICATIONS

D. Schulze, et al., Powders and Bulk Solids: Behavior, Characterizaton, Storage and Flow, Springer, sections 12.2 to 12.3.2.5, pp. 347-363 (2007) (retrieved from internet: https://www.springer.come/gp/book/ 9783540737674 on Oct. 18, 2018).

P. Dunst, et al. "Analysis of Pipe Vibrations in an Ultrasonic Powder Transportation System", Sensors and Actuators A: Physical, Elsevier BV, NL, vol. 263, pp. 733-736 (2017).

Co-pending U.S. Appl. No. 17/614,151, dated May 19, 2020 (available on USPTO system).

* cited by examiner

ADDITIVE MANUFACTURING MACHINE COMPRISING A DEVICE FOR THE DISTRIBUTION OF POWDER ONTO A MOBILE SURFACE USING VIBRATION

BACKGROUND

The invention lies in the field of powder-based additive manufacture through the melting of the grains of this powder using one or more energy or heat sources such as a laser beam and/or an electron beam and/or diodes.

More specifically, the invention lies in the field of additive manufacturing based on powder bed deposition and its aim is to supply powder to the device used to layer the additive manufacturing powder inside an additive manufacturing machine by powder bed deposition.

Even more specifically, the invention aims to provide a movable powder reception surface with a stable and controlled powder flow rate.

The application WO2017108868 describes an additive manufacturing machine based on powder bed deposition comprising a manufacturing enclosure inside which there is a working plane and at least one working zone where layers of powder are spread and consolidated selectively in succession one after the other.

In order to produce the various layers of powder useful to the manufacturing, the machine described in the application WO2017108868 comprises a powder spreading device, such as a roller or a scraper, that can be displaced above the working zone and a device for depositing powder on the working plane comprising a powder reception drawer and a powder injector. The drawer is translationally movable relative to the working plane between a retracted position in which the drawer extends out of the trajectory of the powder spreading device and a deployed position in which the drawer extends at least partly into the trajectory of the powder spreading device. The injector is disposed above the powder reception drawer, so as to distribute powder on the reception drawer when this drawer is displaced between its retracted position and its deployed position.

This application WO2017108868 also provides for the injector to be connected to a powder tank, for example via a coupling of flexible type, and for a dosing hopper to be able to be interposed between the tank and the injector.

However, this application WO2017108868 specifies neither a precise arrangement of the dosing hopper, nor a precise arrangement of the means that make it possible to distribute the powder on the movable drawer.

Now, with a movable powder reception surface as provided in the application WO2017108868, it is necessary to deliver a powder flow rate that is controlled at the output of the injector and stable during the movement of the drawer.

In fact, the quality of the powder bead deposited on the drawer is directly linked to the quality of the parts manufactured.

If the powder flow rate weakens during the movement of the drawer, some layers of powder spread on the working zone will have thicknesses that are insufficient in spots, which will lead to the production of parts with defects or that do not conform.

Also, if the powder flow rate is too great during all or part of the movement of the drawer, a certain quantity of powder will be pointlessly deposited in excess and will increase the already great quantity of powder which is not consolidated and which, in some applications like the manufacturing of prostheses, cannot be reused without being molten and reconditioned as powder again.

The aim of the present invention is to provide a powder distribution device that is capable of delivering a powder flow rate that is stable and controlled at at least one point situated inside the enclosure of an additive manufacturing machine, and notably on a movable powder reception surface situated in proximity to a working zone.

SUMMARY

To this end, the subject of the invention is an additive manufacturing machine based on powder bed deposition, this additive manufacturing machine comprising a manufacturing enclosure and at least one heat or energy source used to selectively melt a layer of additive manufacturing powder deposited inside the manufacturing enclosure. In addition, the additive manufacturing machine comprises at least one movable powder reception surface which can be displaced in proximity to a manufacturing zone situated inside the manufacturing enclosure, a powder spreading device making it possible to spread the powder from the movable reception surface to the manufacturing zone, and a device for distributing powder on the movable reception surface.

According to the invention, the powder distribution device comprises a buffer tank linked to a powder supply and a distribution duct linking the buffer tank to a powder distribution point situated above the movable reception surface.

Still according to the invention, the distribution duct is mounted on a vibrating device making it possible to vibrate the distribution duct so as to generate a continuous flow of powder in the distribution duct and from the buffer tank to the distribution point.

The use of vibrations to distribute an additive manufacturing powder is advantageous because it makes it possible to avoid the use of moving parts, such as, for example, a rotary grooved roller or a translationally mobile plate, which are likely to be blocked or damaged by powder grains or clusters.

By modulating the amplitude and the frequency of the vibrations, the vibrating device makes it possible to easily and rapidly modify the flow rate of the continuous flow of powder between the buffer tank and the distribution point, and therefore the quantity of powder deposited on the movable reception surface, without having to change parts in the distribution device as would be the case with a grooved roller for example.

Still by modulating the amplitude and the frequency of the vibrations, the distribution device can easily and rapidly be adapted to powders of different grain sizes.

Finally, since the distribution device does not include any rotationally or translationally moving parts, the cleaning of the distribution device is simplified, for example when wanting to use the additive manufacturing machine with another batch of powder of different composition and/or of different grain size for example.

BRIEF DESCRIPTION OF THE DRAWINGS

Other features and advantages of the invention will become apparent from the following description. This description, given as a nonlimiting example, refers to the attached drawings in which.

DETAILED DESCRIPTION

The invention relates to an additive manufacturing machine based on powder bed deposition. Additive manufacturing based on powder bed deposition is an additive manufacturing method in which one or more parts are manufactured by the selective melting of different layers of additive manufacturing powder superposed on one another. The first layer of powder is deposited on a support such as a plate, then sintered or melted selectively using one or more energy or heat sources according to a first horizontal section of the part or parts to be manufactured. Then, a second layer of powder is deposited on the first layer of powder which has just been melted or sintered, and this second layer of powder is sintered or melted selectively in its turn, and so on until the last layer of powder useful to the production of the last horizontal section of the part or parts to be manufactured.

Figure 1:
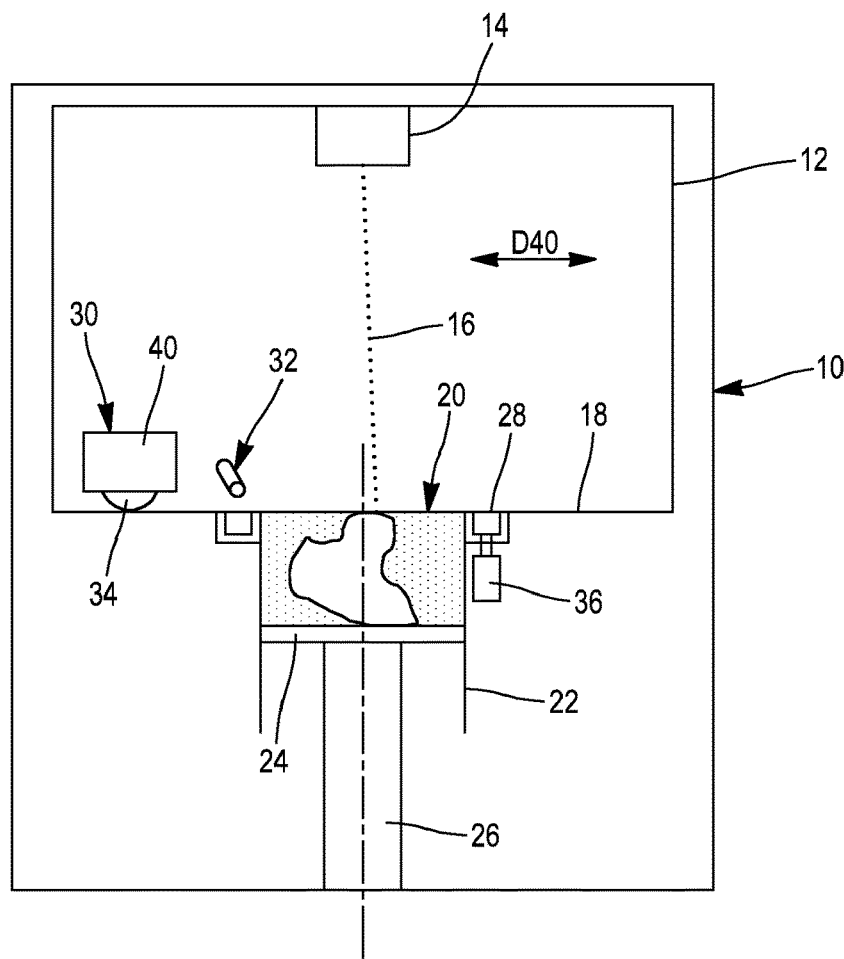
FIG. 1 is a schematic front view of an additive manufacturing machine according to the invention.

As FIG. 1 illustrates and in order to allow for an additive manufacturing of parts by powder bed deposition, the additive manufacturing machine 10 according to the invention comprises a manufacturing enclosure 12 and at least one heat or energy source 14 used to selectively melt, via one or more beams 16, a layer of additive manufacturing powder deposited inside the manufacturing enclosure 12.

The heat or energy source or sources 14 can take the form of sources capable of producing one or more electron beams and/or one or more laser beams. These sources are for example one or more electron guns and/or one or more light-emitting diodes. In order to allow for a selective melting and therefore a displacement of the energy or heat beams 16, each source 14 comprises means for displacing and controlling the beam or beams 16.

The manufacturing enclosure 12 is a sealed enclosure. A wall of this manufacturing enclosure 12 can comprise a window making it possible to observe the manufacturing taking place inside the enclosure. At least one wall of this manufacturing enclosure 12 comprises an aperture giving access to the interior of the enclosure for maintenance or cleaning operations, this aperture being able to be closed tightly using a door during a manufacturing cycle. During a manufacturing cycle, the manufacturing enclosure 12 can be filled with an inert gas such as nitrogen to avoid oxidizing the additive manufacturing powder and/or to avoid the risks of explosion. The manufacturing enclosure 12 can be maintained under slightly excess pressure to avoid the ingress of oxygen, or maintained at a vacuum when an electron beam is used inside the enclosure to sinter or melt the powder.

Inside the manufacturing enclosure 12, the additive manufacturing machine 10 according to the invention comprises: a horizontal working plane 18 and at least one manufacturing zone 20 defined by a manufacturing jacket 22 and a manufacturing plate 24. The jacket 22 extends vertically under the working plane 18 and it emerges in the working plane 18. The manufacturing plate 24 slides vertically inside the manufacturing jacket 22 under the effect of an actuator 26 such as a power cylinder.

In order to produce the different layers of powder useful to the additive manufacturing of the part or parts to be manufactured, the additive manufacturing machine according to the invention comprises at least one movable powder reception surface 28 that is capable of being displaced in proximity to a manufacturing zone 20 situated inside the manufacturing enclosure, a powder spreading device 30 making it possible to spread the powder from the movable reception surface 28 to the manufacturing zone 20, and a device 32 for distributing powder on the movable reception surface 28.

The spreading device 30 takes the form of a scraper or of a roller 34 mounted on a carriage 40. This carriage 40 is mounted to be translationally mobile in a horizontal direction D40 above the manufacturing zone 20. To this end, the carriage 40 is, for example, mounted on rails 41. In order to be driven by horizontal translation, the carriage 40 can be motorized, or set in motion by a motor located inside or preferably outside the manufacturing enclosure 12 and via a motion transmission system such as pulleys and a belt.

Preferably, in the additive manufacturing machine according to the invention, the powder reception surface 28 is mounted to be movable about the manufacturing zone 20 and set in motion about the manufacturing zone 20 by an actuator 36 such as a motor.

By being mounted to be movable about the manufacturing zone, the reception surface 28 offers a reduced bulk about the manufacturing zone 20. Furthermore, the mobility of the reception surface about the manufacturing zone makes it possible to take powder away from anywhere in front of the manufacturing zone 20, which allows the spreading device 30 to work in the two opposing directions of the horizontal line D40 of translation of the carriage 40.

Preferably, the reception surface 28 is mounted to be rotationally movable about the manufacturing zone 20 and driven in rotation about the manufacturing zone 20 by the actuator 36.

In more detail, the reception surface 32 is mounted to be rotationally movable about a vertical axis 32 and driven in rotation about this vertical axis by the actuator 36.

Figure 2:
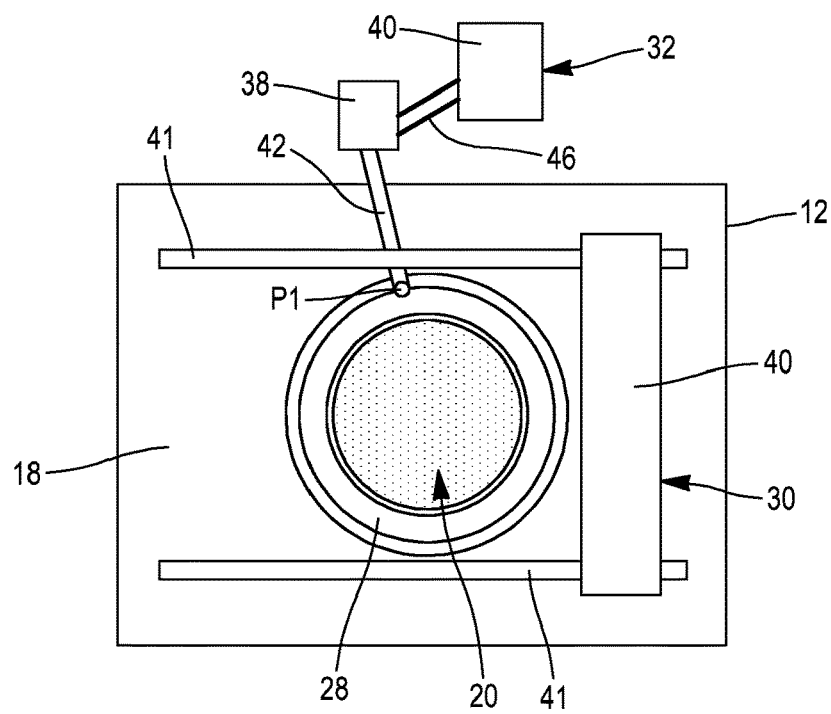
FIG. 2 is a schematic plan view of an additive manufacturing machine according to the invention.

To manufacture revolution parts or improve the mechanical strength of the manufacturing jacket 22 to a vacuum with a view to additive manufacturing by electron beam, the manufacturing jacket 22 is preferably cylindrical and the manufacturing zone 20 is preferably circular, as illustrated in FIG. 2.

Since the manufacturing jacket 22 is preferably cylindrical about a vertical central axis D22, the vertical axis D32 of rotation of the reception surface 32 coincides with the vertical central axis D22 of the cylindrical manufacturing jacket 22 and of the manufacturing zone 20.

Also, the movable reception surface 28 is preferably annular and it outwardly encircles the manufacturing zone 20 over all its circumference. Still preferably, the movable reception surface 28 is annular about its vertical axis D32 of rotation.

This annular configuration of the movable reception surface 28 makes it possible to minimize as much as possible the bulk of this surface about the manufacturing zone 20.

To deposit powder on the movable reception surface 28, the additive manufacturing machine according to the invention comprises a device 32 for distributing powder on the movable reception surface 28.

According to the invention, and as FIG. 2 schematically illustrates, the powder distribution device 32 comprises a buffer tank 38 linked to a powder supply 40 and a distribution duct 42 linking the buffer tank 38 to a powder distribution point P1 situated above the movable reception surface 28.

Figure 3:
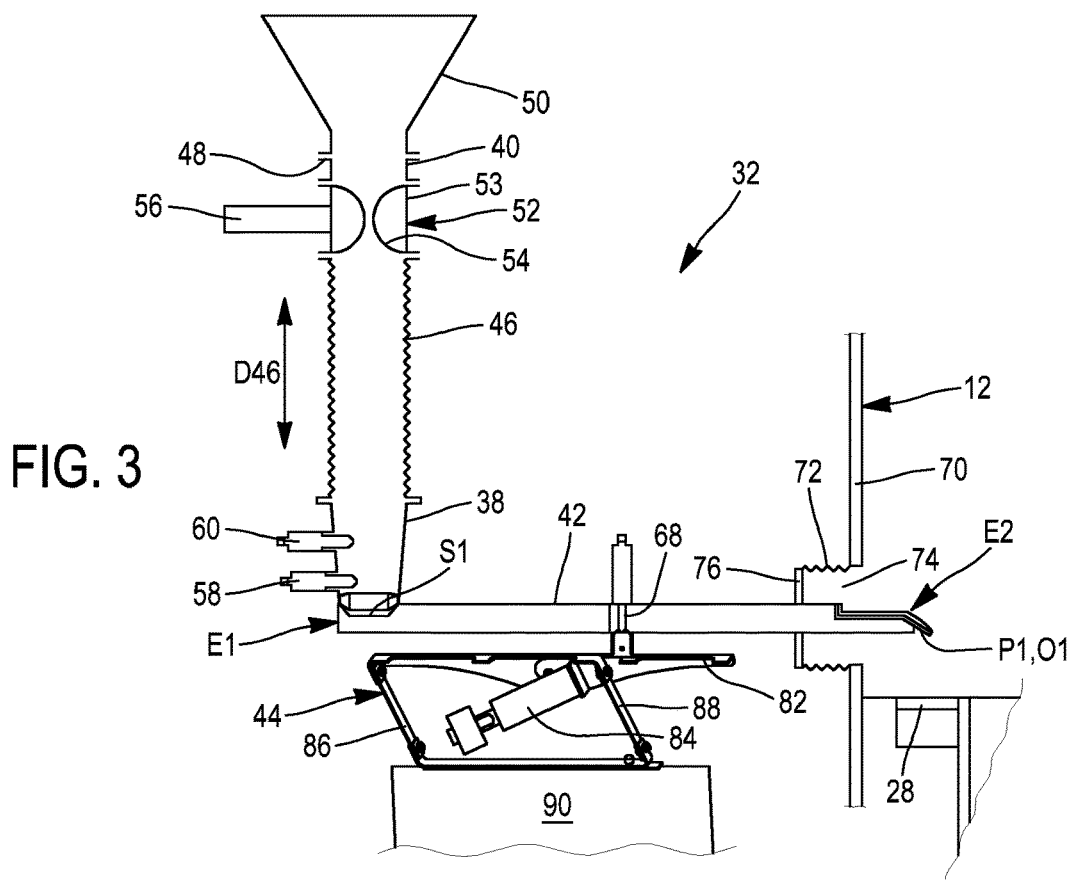
FIG. 3 is a side view of a first variant of a powder distribution device of an additive manufacturing machine according to the invention.
Figure 4:
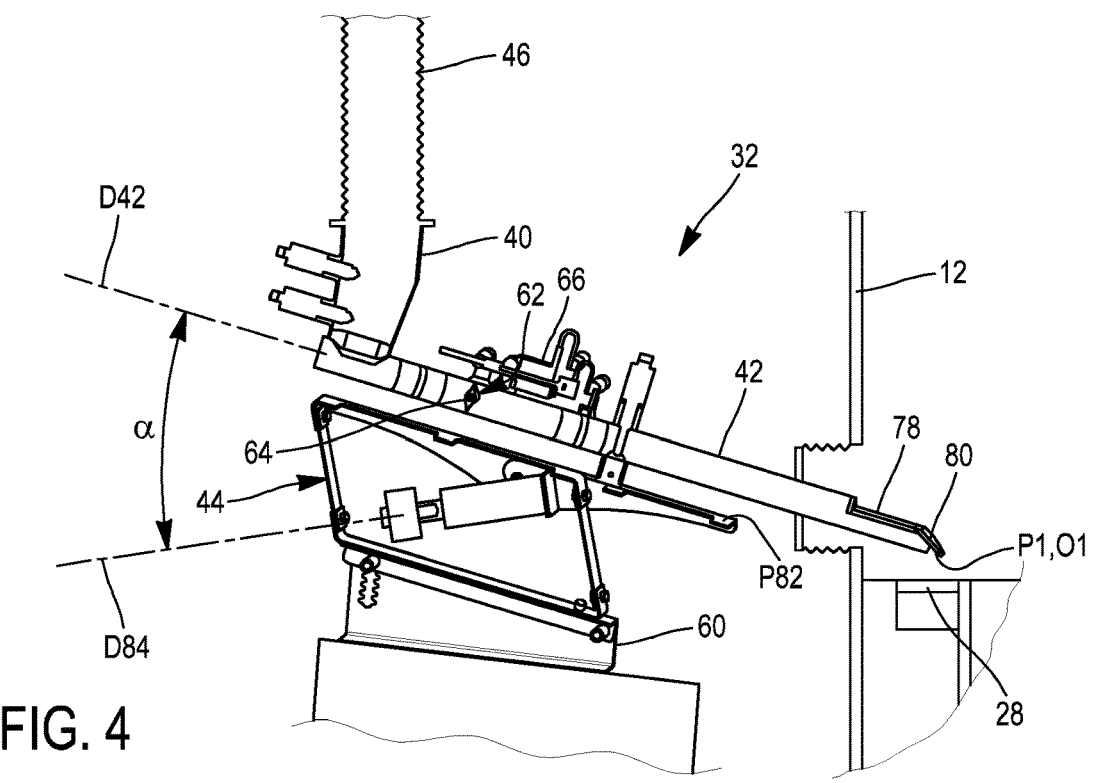
FIG. 4 is a side view of a second variant of a powder distribution device of an additive manufacturing machine according to the invention.

Still according to the invention, and as FIGS. 3 and 4 illustrate, the distribution duct 42 is mounted on a vibrating device 44 making it possible to vibrate the distribution duct so as to generate a continuous flow of powder in the distribution duct and from the buffer tank 38 to the powder distribution point P1.

Preferably, the buffer tank 38 is rigidly fixed to the distribution duct 42. Thus, the vibrating device 44 also makes it possible to vibrate the buffer tank 38 to promote the flow of powder and avoid the creation of powder arches inside the buffer tank 38.

In more detail, the buffer tank 38 is fixed to an upstream end E1 of the distribution duct, and the powder distribution point is situated at the other, downstream end E2 of the distribution duct.

In order to isolate the powder supply 40 from the vibrations of the distribution duct 42 and of the buffer tank, the buffer tank 38 is linked to the powder supply by a flexible duct 46, for example of bellows type. This flexible duct is preferably produced in a chloroprene-based rubbery composition, offering a good vacuum-tightness.

In order to favour the flow of the powder by gravity in the flexible duct 46, the powder supply 40 is disposed above the buffer tank 38. To the same end, the flexible duct is preferably disposed along a vertical line D46.

The powder supply 40 can be linked to an automated powder supply circuit, but preferably, the powder supply comprises reception means 48 of a main tank 50. These reception means 48 for example take the form of a flange.

The main tank 50 has a large content, of several tens of litres for example, in order to contain a quantity of powder that is sufficient for an entire additive manufacturing cycle. By comparison with the main tank 50, the buffer tank 38 offers a lesser content, of only a few litres. That makes it possible to avoid making a large quantity of powder vibrate and therefore avoid an overdimensioning of the vibrating device 44.

Because of its small content, the buffer tank 38 must be regularly resupplied with powder. To this end, a diaphragm control valve 52 is inserted between the powder supply 40 and the flexible duct 46. In more detail, the diaphragm control valve 52 comprises a hollow body 53 and an internal diaphragm 54 which extends or retracts so as to block or free the passage of powder between the powder supply 40 and the flexible duct 46. The internal diaphragm 54 extends or retracts for example by varying the pressure of the gas or gases contained in the sealed volume situated between the hollow body 53 and this internal diaphragm.

The use of a diaphragm control valve 52 is particularly suited to the regulation of a flow of powder because it does not include blocking pieces of butterfly type likely to be blocked when set in motion by powder grains.

To best manage the resupplies of powder from the buffer tank 38, the buffer tank 38 is equipped with at least one low powder level detector 58. Preferably, the buffer tank 38 is equipped with a high powder level detector 60 and a low powder level sensor 58. The operation, and more particularly the opening, of the diaphragm control valve 52 is slaved to the information transmitted by the powder level detector or detectors with which the buffer tank 38 is equipped.

The vibrations generated by the vibrating device 44 make it possible to generate a continuous flow of powder in the distribution duct 42 and from the buffer tank 38 to the distribution point P1 even if this distribution duct 42 is disposed horizontally. However, as FIG. 4 illustrates, the vibrating device 44 and the distribution duct 42 can also be mounted on a support with adjustable inclination 60. This support with adjustable inclination 60 makes it possible to tilt the distribution duct 42 so as to place the buffer tank 38 above the distribution point P1, for example to promote the flow of additive manufacturing powders that are less fluid than others.

Following different tests, it emerged that an inclination of the distribution duct 42 of 10° relative to the horizontal offered a good compromise with respect to the flow rate of the flow of powder and its stability upon distribution.

Coupled with the use of vibrations, an inclination of the distribution duct 42 can lead to an optimal control of the flow rate and of the stability of the flow of powder between the buffer tank 38 and the distribution point P1, and therefore to an optimal quality of the powder bead deposited on the movable reception surface 28.

The vibrating device 44 for example takes the form of a platform 82 to which is fixed the distribution duct 42, and therefore the buffer tank 38, and a vibrator 84. The vibrator 84 for example takes the form of a double-acting cylinder with masses mounted on its stem. The platform 82 is mounted on two flexible blades 86, 88 fixed to a frame 90, this frame 90 being vibrationally separated from the manufacturing enclosure, and more generally from the chassis of the machine.

Preferably, the vibrator 84 is mounted along a line D84 inclined by an angle $\alpha$ of 25° relative to the plane P82 of the platform 82, and therefore relative to the longitudinal line D42 of the distribution duct 42, the distribution duct 42 being mounted parallel to the plane P82 of the platform. Thus, the vibrations created by the vibrating device 44 extend in a line inclined by 25° relative to the longitudinal line D42 of the distribution duct 42.

Still preferably, the vibrations generated by the vibrator 84 have a peak-to-peak amplitude of approximately 2 millimetres, i.e. 1 millimetre on either side of a central point.

Finally, the vibrations generated by the vibrator 84 are situated in the low frequencies, from 1 Hz to 150 Hz. For a low-density powder composed of titanium for example, the vibrations used have a frequency situated around 15 Hz. For a more dense powder composed of stainless steel for example, the vibrations used have a frequency situated around 35 Hz. Therefore, ideally, the vibrations generated by the vibrator 84 are situated between 10 and 50 Hz.

With or without support with adjustable inclination 60, the vibrations generated by the vibrating device 44 can make it possible to adequately control the flow rate and the stability of the flow of powder between the buffer tank 38 and the distribution point P1. However, to distribute very fluid powders or to even better control the flow rate and the stability of the flow of powder between the buffer tank 38 and the distribution point P1, the powder distribution device 32 can comprise a flow rate regulator 62 inside the distribution duct 42.

This flow rate regulator 62 preferably takes the form of a shutter 64 mounted to be rotationally movable inside the distribution duct 42. By varying the inclination of the shutter 64, the internal section of the distribution duct 42 is locally varied, which makes it possible to increase or reduce the maximum flow rate of the flow of powder in the distribution duct 42 between the buffer tank 38 and the powder distribution point P1.

Advantageously, the inclination of the shutter 64 can be controlled via an actuator 66 such as a power cylinder.

It should be noted that, even though it is feasible, there is no plan to vary the inclination of the shutter 64 during powder distribution. On the other hand, it is planned to find the best position of the shutter through tests, in other words the position that allows the best control of the flow of the powder to be distributed, and to retain this position throughout the additive manufacturing cycle and therefore during each powder distribution cycle performed on the movable reception surface 28 during an additive manufacturing cycle.

To ensure that the upstream end E1 of the distribution duct 42 is filled with powder, the buffer tank 38 has a section greater than the section of the distribution duct 42. More specifically, the minimum section of the buffer tank is approximately two times greater than the maximum section of the distribution duct 42.

Preferably, the buffer tank 38 is of tapered form and linked to the distribution duct 42 by its smaller diameter base. Preferably, the distribution duct 42 takes the form of a cylindrical tube, for example made of metal. Also, the internal section of the smaller diameter base of the buffer tank 38 is approximately two times greater than the internal section of the tube forming the distribution duct.

To avoid the appearance of powder arches in the bottom part of the buffer tank 38 and favour the action of the vibrations on the flow of the powder, the junction section S1 between the buffer tank 38 and the distribution duct 42 has an oblong form.

Since the buffer tank 38 is of tapered form and linked to the distribution duct 42 by its smaller diameter base, the buffer tank 38 is linked to the flexible duct 46 by its larger diameter base. The internal section of the larger diameter base of the buffer tank 38, and the internal sections of the flexible duct 46, of the diaphragm control valve 52 and of the powder supply 40 are approximately three times greater than the internal section of the tube forming the distribution duct.

Preferably, the tube forming the distribution duct 42 has a circular internal section with a diameter greater than or equal to 4 centimetres. Below this diameter, flow problems can occur with certain powders.

Preferably, the powder supply 40, the diaphragm control valve 52, the flexible duct 46 and the larger base of the buffer tank 38 have circular internal sections of a diameter greater than or equal to 10 centimetres of diameter in order to avoid the appearance of powder arches without it being necessary to provide means, a stirring device or vibrations for example, intended to break up any arches inside these components of the powder distribution device. The powder supply 40 and the diaphragm control valve 52 have internal sections of greater diameter because these components are not subject to the vibrations which would make it possible to avoid the appearance of powder arches. Likewise, the flexible duct 46 has an internal section of greater diameter because the material of this duct absorbs the vibrations.

In order to avoid any risk of appearance of powder arches in the flexible duct 46, this flexible duct 46 has a length of a few tens of centimetres, and preferably of only 5 centimetres.

To give an idea, the distribution duct 42 has a length of approximately 800 millimetres, this length being dictated by the distance needed to pass under the rails 41 inside the manufacturing enclosure 12 and by the bulk of the vibrating device 44 outside the manufacturing enclosure 12.

In order to ensure that a flow of powder is indeed present between the buffer tank 38 and the powder distribution point P1, the powder distribution device 32 can comprise a powder detector 68 placed inside the distribution duct 42. Ideally, this powder detector 68 is disposed midway along the tube forming the distribution duct 42. In the case where a flow rate regulator 62 is provided inside the distribution duct, the powder detector 68 is provided downstream of the regulator.

Preferably, the powder high level 60, powder low level 58 and powder presence 68 detectors in the duct 42 take the form of high-frequency capacitive sensors that make it possible to detect metallic or non-metallic powders such as ceramic powders for example.

In the machine according to the invention, the movable reception surface 28 is situated preferably inside the manufacturing enclosure 12, the distribution point P1 is situated preferably inside the manufacturing enclosure 12, above the movable reception surface 28 or above a point through which the movable reception surface 28 passes when it is positioned in proximity to a manufacturing zone.

Since the powder distribution point P1 is situated preferably inside the manufacturing enclosure 12, the distribution duct 42 passes through a wall 70 of the manufacturing enclosure 12 of the machine and the buffer tank 38 is situated outside of the manufacturing enclosure 12. In more detail, only the downstream end E1 of the distribution duct is present inside the manufacturing enclosure 12, the vibrating device 44, the flexible duct 46, the diaphragm control valve 52, the powder supply 40 and the main tank 50 being preferably disposed outside of the manufacturing enclosure 12.

In order to avoid the transmission of vibrations between the distribution duct 42 and the wall 70 of the enclosure passed through by this duct and also in order to maintain the seal-tightness of the manufacturing enclosure, a flexible sleeve 72, for example of bellows form, links the wall 70 to the distribution duct 42. In more detail, the flexible sleeve 72 links an aperture 74 made in the wall 70 of the enclosure to a crown ring 76 mounted around the distribution duct 42.

Advantageously, the flexible sleeve 72 also allows the inclination of the distribution duct 42 with the support with adjustable inclination 60.

Above the working plane 18 and the movable reception surface 28, the distribution point P1 is formed by the downstream end E2 of the distribution duct 42. This downstream end comprises a first reduction of section 78 that is constant over a length of a few centimetres to reduce the bulk of the downstream end E2 of the distribution duct 42, and notably to allow the downstream end E2 of the distribution duct 42 to pass under the rails 41 of the carriage 40.

Then, the downstream end E2 of the duct 42 comprises a second reduction of section 80 gradually reducing the internal section of the distribution duct 42 to an aperture O1 forming the powder distribution point P1. This second reduction of section 80 makes it possible to break the powder jet in order to avoid spraying powder beyond the movable reception surface 28. Furthermore, this second reduction of section 80 takes the form of a metal part a few millimetres thick in order to protect the distributed powder from the X-rays generated by the use of an electron beam for the additive manufacturing.

Preferably, the aperture O1 forming the powder distribution point P1 is oriented downward, that is to say facing the working plane 18 and the movable reception surface 28. This orientation favours the flow of the powder onto the movable reception surface 28 and limits the sprays of powder beyond the movable reception surface 28.

The powder distribution point P1 is preferably unique. However, in the case where several manufacturing zones 20 are present within the manufacturing enclosure 12, the additive manufacturing machine can comprise several movable reception surfaces and therefore several powder distribution points belonging to different powder distribution devices 32 according to the invention, preferably one distribution device and one distribution point per manufacturing zone and movable reception surface.

Still preferably and because the reception surface 28 is movable, the powder distribution point P1 is fixed inside the manufacturing enclosure 12.

The uniqueness of the powder distribution point P1 is advantageous because it makes it possible to reduce the bulk of the distribution device 32 and of the machine 10 as a whole.

Advantageously, by varying the rate of displacement of the movable reception surface 28 during a powder distribution, it is possible to vary the height of the powder bead deposited in proximity to the manufacturing zone 20. That makes it possible to best fit the quantity of powder deposited on the movable reception surface 28 to a manufacturing zone 20 having at least two different lengths in the horizontal line D40 of translation of the carriage 40, as for example in the case of a circular manufacturing zone 20.

Once the powder bead is deposited on the movable reception surface 28 via the distribution point P1, the spreading device 30 is translated so as to spread the powder over the manufacturing zone 20 which can be circular or polygonal.

Preferably, the main tank 50, the powder supply 40, the body 53 of the diaphragm control valve 52, the buffer tank 38 and the distribution duct 42 are produced in a stainless steel which is a material which retains a good vacuum-tightness. Furthermore, the main tank 50, the powder supply 40, the body 53 of the diaphragm control valve 52, the buffer tank 38 and the distribution duct 42 are produced in a stainless and non-magnetic steel in order to avoid magnetizing the metallic powders.

Ideally, the powder distribution point P1 is situated at approximately 1 centimetre from the movable reception surface 28. This height is sufficient to allow the deposition of a powder bead a few millimetres high on the movable reception surface 28 and avoid spraying powder beyond the movable reception surface 28.

The invention claimed is:

1. An additive manufacturing machine, based on powder bed deposition, comprising:
    a manufacturing enclosure;
    at least one heat or energy source used to selectively melt a layer of additive manufacturing powder deposited inside the manufacturing enclosure;
    at least one movable powder reception surface capable of being displaced in proximity to a manufacturing zone situated inside the manufacturing enclosure;
    a powder spreading device configured to spread the powder from the at least one movable powder reception surface to the manufacturing zone; and
    a powder distribution device for distributing powder on the movable reception surface,
    wherein the powder distribution device comprises a buffer tank linked to a powder supply and a distribution duct linking the buffer tank to a powder distribution point situated above the movable reception surface, and
    wherein the distribution duct is mounted on a vibrating device configured to vibrate the distribution duct so as to generate a continuous flow of powder in the distribution duct and from the buffer tank to the powder distribution point.

2. The additive manufacturing machine according to claim 1, wherein the buffer tank is rigidly fixed to the distribution duct.

3. The additive manufacturing machine according to claim 1, wherein the buffer tank is linked to the powder supply by a flexible duct.

4. The additive manufacturing machine according to claim 3, wherein the powder supply comprises reception means from a main tank.

5. The additive manufacturing machine according to claim 3, wherein a diaphragm control valve is inserted between the powder supply and the flexible duct.

6. The additive manufacturing machine according to claim 1, wherein the vibrating device and the distribution duct are mounted on a support with adjustable inclination.

7. The additive manufacturing machine according to claim 1, wherein the powder distribution device comprises a flow rate regulator inside the distribution duct.

8. The additive manufacturing machine according to claim 7, wherein the flow rate regulator takes the form of a shutter movably mounted to rotate inside the distribution duct.

9. The additive manufacturing machine according to claim 1, wherein the buffer tank has a section greater than a section of the distribution duct.

10. The additive manufacturing machine according to claim 9, wherein a junction section between the buffer tank and the distribution duct has an oblong form.

11. The additive manufacturing machine according to claim 1, wherein the powder distribution device comprises a powder detector placed inside the distribution duct.

12. The additive manufacturing machine according to claim 1, wherein the distribution duct passes through a wall of the manufacturing enclosure, the powder distribution point being situated inside the manufacturing enclosure and the buffer tank being situated outside the manufacturing enclosure.

* * * * *